Aug. 24, 1926.
W. WEILER
1,597,493
FREQUENCY CHANGER
Filed Nov. 7, 1924
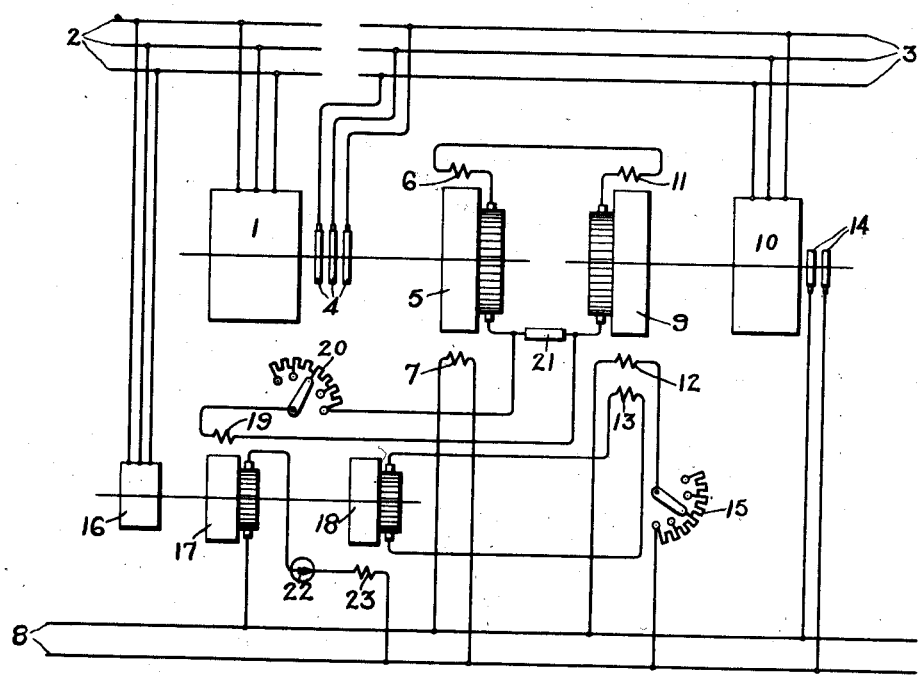
Inventor:
Wilhelm Weiler;
by
His Attorney.

Patented Aug. 24, 1926.

1,597,493

UNITED STATES PATENT OFFICE.

WILHELM WEILER, OF NIEDERSCHONHAUSEN, GERMANY, ASSIGNOR TO GENERAL ELECTRIC COMPANY. A CORPORATION OF NEW YORK.

FREQUENCY CHANGER.

Application filed November 7, 1924, Serial No. 748,501, and in Germany February 29, 1924.

My invention relates to frequency changers for interconnecting alternating current systems operated at different frequencies, and has for its object the provision of an improved arrangement for limiting the energy transmitted through a frequency changer to a safe value without interfering with the ready interchange of energy between the different systems under normal operating conditions.

For the purpose of explaining my invention, it will be described as utilized in connection with an induction frequency converter. It is well known that when an induction machine is driven after the manner of an ordinary induction motor, the energy supplied to the primary winding is divided into two parts, one of these parts being converted into mechanical energy by which the motor is rotated and the other part being utilized to produce in the secondary circuit electromotive forces which have the same phase relation that exist in the primary circuit but are of different frequency. When the primary and secondary circuits of the induction machine are connected to alternating current systems operated at different frequencies, this machine operates as a frequency converter to permit an interchange of power between the two systems. Under these conditions, the magnitude and direction of power transmission between the two systems is dependent upon the relation existing between the frequencies at which the systems are operated and the interchanged power may be limited in value by control of the torque exerted by or upon the shaft of the converter. Various arrangements have been proposed and used for varying the rotor speed of the converter in a manner to prevent excessive transfers of energy therethrough between the two systems. Many, if not all, of these arrangements have been constructed in such a manner as to hinder the free interchange of energy between the systems under normal operating conditions, thus interfering with the buffer action of the converter. In accordance with my invention, this difficulty is avoided by intentionally providing for a strong buffer action and arranging means to limit the energy transmitted through the converter to a safe value.

My invention will be better understood from the following description when considered in connection with the accompanying drawing and its scope will be pointed out in the appended claims.

The drawing shows a frequency converter 1 arranged to have its stator winding interconnected with a polyphase line 2 and to have its rotor winding connected to a polyphase line 3 through slip rings 4. A direct current machine 5, which comprises a series field winding 6 and a shunt field winding 7 arranged to be supplied with current through the line 8 is mechanically coupled to the converter 1 and is interconnected with a direct current machine 9. The machine 9 is coupled to a synchronous alternating current machine 10 and is provided with a series field winding 11 and with shunt field windings 12 and 13. The stator winding of the machine 10 is arranged to be connected to the polyphase line 3 and its field winding is arranged to be supplied with current from the line 8 through slip rings 14.

The shunt field winding 12 of the machine 9 is arranged to be supplied with current through an adjustable resistor 15 which is provided for limiting the amount of energy transmitted from the line 3 through the converter 1 to the line 2. The shunt field winding 13 is provided for the purpose of preventing an excessive transfer of energy from the line 2 to the line 3 through the converter 1 and is arranged to be supplied with current through a control aggregate comprising a motor 16 to which are coupled direct current generators 17 and 18. The field winding 19 of the direct current generator 17 is arranged to be connected through an adjustable resistor 20 to the terminals of a shunt 21 which is connected in series between the direct current machines 5 and 9. With this connection there will therefore be supplied to the field winding 19 a current which is proportional in value to the magnitude of the current transmitted between the machines 5 and 9. The armature winding of the generator 17 is connected through an asymmetric valve 22 and the field winding 23 of the generator 18 to the direct current line 8, the connection being so arranged that the voltage of the machine 17 is opposed to that of the line 8. The generated electromotive force of the machine 17 is thus directly proportional in value to the current transmitted between the machines 5 and 9 and may be regulated in value by means of the resistor 20. With any given adjustment no current will be supplied to the field winding 23 of the machine 18 until the electromotive force of the machine 17 becomes greater than the voltage of the direct current line 8. When this occurs, the field winding 13 of the machine 9 is energized and, as hereinafter explained, a restraining influence is brought to bear on the transmission of energy from the system represented by the line 2 to that represented by the line 3.

The direction of energy transmission between the machines 5 and 9 is dependent upon the energy transmission through the converter 1 between the polyphase systems represented by lines 2 and 3. The conditions under which no current will be transmitted between the machines 5 and 9 may be controlled by adjustment of the resistor 15 through which the voltage of the machine 9 is controlled. When the electromotive forces of the machines 5 and 9 are equal, the current transmitted between these machines will of course be nil. Under these conditions, the energy supplied from the line 3 to the line 2 for example, consists of two parts, one of which produces mechanical rotation of the converter rotor and the other of which accomplishes the transfer of energy from the line 3 to the line 2. In initiating the operation of the apparatus, the resistor 15 is so adjusted as to balance the electromotive forces of the machines 5 and 9 at such a value as to prevent the transmission of an excessive amount of energy from the line 3 to the line 2 under any operating conditions likely to be encountered.

Assuming that this adjustment has been made, the manner in which the transmission of excessive amounts of energy from the line 3 to the line 2 is prevented will be readily understood. Starting with a condition of no current transmission between the machines 5 and 9, predetermined as previously indicated, an increase in the operating frequency of line 3 will produce an increase in the amount of energy transmitted from the line 3 to the line 2, the machine 9 being driven as a generator by the synchronous machine 10 and the machine 5 being operated as a motor by current supplied from the machine 9. With further increases in the frequency of the line 3, the load on the machine 9 is increased and there is a tendency to restrict the amount of energy transmitted from the line 3 to the line 2 due to the fact that the flux of the winding 11 is opposed to that of the winding 12 and the flux of the winding 6 is in the same direction as that of the winding 7. As the current supplied from the machine 9 to the machine 5 increases, the electromotive forces of the machines 5 and 9 approach a condition of equality and the amount of energy transmitted from the line 3 to the line 2 is restricted to a safe value. It will be observed that this result is accomplished without interfering with the buffer action of the converter under normal operating conditions. In order further to strengthen the buffer action, the ohmic resistance of the machines 5 and 9 is made low. While variations in the amount of energy transferred from the line 3 to the line 2 have been considered as produced by increases in the frequency of the line 3, it will be apparent that like results will follow decreases in the frequency of the line 2.

With the excitation of the machine 9 adjusted by the resistor 15 properly to limit the amount of energy transmitted from the line 3 to the line 2 under conditions likely to be encountered, the tendency to transfer excessive amounts of energy from the line 2 to the line 3 in response either to rises in the frequency of line 2 or decreases in the frequency of line 3 is increased. As previously indicated, the machine aggregate comprising machines 16, 17 and 18, the shunt 21 connected in series between the machines 5 and 9, the asymmetric valve 22 connected in series with the field winding of the machine 18 between the machine 17 and the direct current line 8, and the field winding 13 of the machine 9, are provided for restricting to a safe value the energy transmitted from the line 2 to the line 3. The manner in which this result is accomplished will be readily understood if it be assumed that the frequency of the line 3 decrease instead of increases as assumed when considering the manner in which the energy transferred from the line 3 to the line 2 is restricted to a safe value. When the frequency of the line 3 decreases, the machine 5 is driven as a generator by the converter 1, current is supplied from the machine 5 to the machine 9 which operates as a motor to drive the synchronous machine 10 and the energy transferred from the line 2 to the line 3 is increased. As the amount of energy transferred from the line 2 to the line 3 increases, however, the current transmitted between the machines 5 and 9 increases and ultimately reaches a value, predetermined by the setting of the resistor 20, at which the electromotive force of the machine 17 becomes greater than the voltage of the direct current line 8. When this occurs, current is supplied to the field winding 23 of the machine 18, and the field winding 13 of the machine 9 is energized in a manner to increase the voltage of the machine 9 and eventually to establish conditions by which the amount of energy transferred from the line 2 to the line 3 is maintained within safe limits. My invention thus affords a reliable means of maintaining the amounts of energy exchanged between two alternating current systems within the limits for which the frequency converter is designed and makes it possible to accomplish this result without interfering with the buffer action which it is desirable that the converter exert between the two alternating current systems.

As will be evident to those skilled in the art, my invention permits of various modifications without departing from the true spirit thereof or from the scope of the appended claims.

What I claim as new and desire to secure by Letters Patent of the United States, is,—

1. An arrangement wherein a frequency changer adapted to be connected between different alternating current systems is mechanically coupled to one of a pair of interconnected electrodynamic machines each adapted to operate as a motor when the other is driven as a generator, comprising means associated with one of said machines for limiting the energy transmitted through said frequency changer, and means including an asymmetric valve for energizing said energy limiting means when the current transmitted between said machines exceeds a predetermined value.

2. An arrangement wherein a frequency changer adapted to be connected between different alternating current systems is mechanically coupled to one of a pair of interconnected electrodynamic machines each adapted to operate as a motor when the other is driven as a generator, comprising means for controlling the excitation of one of said machines to limit the energy transmitted through said frequency changer in one direction, and means including an asymmetric valve operable in response to a predetermined value of the current transmitted between said machines for controlling the excitation of one of said machines to limit the energy transmitted through said frequency changer in the opposite direction.

3. An arrangement wherein a frequency changer adapted to be connected between different alternating current systems is mechanically coupled to one of a pair of interconnected electrodynamic machines each adapted to operate as a motor when the other is driven as a generator, comprising a resistor associated with a field circuit of one of said machines for limiting the energy transmitted through said frequency changer in one direction, and means including an asymmetric valve operable in response to a predetermined value of the current transmitted between said machines and associated with a field circuit of one of said machines for limiting the amount of energy transmitted through said circuit in the opposite direction.

4. An arrangement wherein a frequency changer adapted to be connected between different alternating current systems is mechanically coupled to one of a pair of interconnected electrodynamic machines each adapted to operate as a motor when the other is driven as a generator, comprising a field winding associated with one of said machines, a resistor connected in the circuit of said field winding for controlling its energization to limit the energy transmitted through said frequency changer in one direction, a second field winding associated with said machine, and means including an asymmetric valve for energizing said second mentioned field winding at a predetermined value of the current transmitted between said machines to limit the energy transmitted through said frequency changer in the opposite direction.

5. An arrangement wherein a frequency changer adapted to be connected between different alternating current systems is mechanically coupled to one of a pair of interconnected electrodynamic machines each adapted to operate as a motor when the other is driven as a generator, comprising a field winding associated with one of said machines for limiting the energy transmitted through said frequency changer, a source of current operable in accordance with the value of the current exchanged between said machines, and means operable to cause said winding to be energized when the electromotive force of said source has attained a predetermined value.

6. An arrangement wherein a frequency changer adapted to be connected between different alternating current systems is mechanically coupled to one of a pair of interconnected electrodynamic machines each adapted to operate as a motor when the other is driven as a generator, comprising a field winding associated with one of said machines for limiting the energy transmitted through said frequency changer, a source of current operable in accordance with the value of the current exchanged between said machines, a second source of current, an asymmetric valve connected between said sources for precluding the transmission of current therebetween until the electromotive force of said first mentioned source exceeds in value that of said second mentioned source, and means operable in accordance with the current transmitted between said sources for energizing said field winding.

7. An arrangement wherein a frequency changer adapted to be connected between different alternating current systems is mechanically coupled to one of a pair of interconnected electrodynamic machines each adapted to operate as a motor when the other is driven as a generator, comprising a field winding associated with one of said machines for limiting the energy transmitted through said frequency changer, a source of current operable in accordance with the value of the current exchanged between said machines, a second source of current, an asymmetric valve connected between said sources for precluding the transmission of current therebetween until the electromotive force of said first mentioned source exceeds in value that of said second mentioned source, and an electrodynamic machine operable in accordance with the current transmitted between said sources for energizing said field winding.

8. An arrangement comprising a pair of low resistance interconnected electrodynamic machines each arranged to operate as a motor when the other is driven as a generator, a frequency changer mechanically coupled to one of said machines, and means including an asymmetric valve for controlling the excitation of one of said machines in accordance with the current transmitted between said machines to limit the energy transmitted through said frequency changer to a predetermined value.

In witness whereof, I have hereunto set my hand this 13th day of October, 1924.

WILHELM WEILER.